US006773181B2

(12) United States Patent
Crum

(10) Patent No.: US 6,773,181 B2
(45) Date of Patent: Aug. 10, 2004

(54) DIE CUT SHEET WITH APPLIED COATING CARRIER

(75) Inventor: Jesse D. Crum, Fort Scott, KS (US)

(73) Assignee: Ward-Kraft, Inc., Fort Scott, KS (US)

(*) Notice: Subject to any disclaimer, the term of this patent is extended or adjusted under 35 U.S.C. 154(b) by 0 days.

(21) Appl. No.: 10/065,735

(22) Filed: Nov. 13, 2002

(65) Prior Publication Data

US 2004/0091299 A1 May 13, 2004

(51) Int. Cl.[7] .......................... B41J 11/26; B32B 31/00; B32B 27/14

(52) U.S. Cl. ......................... 400/621; 283/81; 156/277; 428/43; 428/198

(58) Field of Search .......................... 400/621; 283/81; 156/277, 268, 379.1; 428/41.6, 43, 192, 198, 349, 469; 40/638

(56) References Cited

U.S. PATENT DOCUMENTS

| | | | | |
|---|---|---|---|---|
| 5,354,588 A | * | 10/1994 | Mitchell et al. | 428/41.6 |
| 5,766,401 A | * | 6/1998 | Campbell et al. | 156/277 |
| 6,016,618 A | * | 1/2000 | Attia et al. | 40/68 |
| 6,153,045 A | * | 11/2000 | Soltysiak et al. | 156/379.6 |
| 6,299,945 B1 | * | 10/2001 | Mertz et al. | 427/503 |
| 6,331,018 B1 | * | 12/2001 | Roth et al. | 283/81 |
| 6,626,464 B1 | * | 9/2003 | Flaherty et al. | 283/81 |
| 6,652,171 B1 | * | 11/2003 | Onishi | 400/621 |
| 2001/0001047 A1 | * | 5/2001 | Nelson et al. | 428/349 |
| 2002/0015086 A1 | * | 2/2002 | Shiraiwa | 428/43 |
| 2003/0077465 A1 | * | 4/2003 | Boudouris et al. | 428/469 |
| 2003/0089452 A1 | * | 5/2003 | Hansen et al. | 156/268 |
| 2003/0146570 A1 | * | 8/2003 | Milton et al. | 400/621 |

* cited by examiner

*Primary Examiner*—Eugene H. Eickholt
(74) *Attorney, Agent, or Firm*—Hovey Williams LLP

(57) ABSTRACT

A die cut printed blank (10) providing a bisectional, continuous printed surface (24) defined by non-magnetic and magnetic sheets (12,14) joined with an adhesion seam (36) is disclosed. The blank (10) broadly includes a printable sheet (12), a magnetic sheet (14) coupled to the printable sheet (12), a coating carrier (16) applied to the magnetic sheet (14), and a plurality of die cuts (18) in the magnetic sheet (14). The coating carrier (16) is a thin solid liner having a relatively low coefficient of friction that is formed by applying a curable liquid to the rear face (34*b*) of the magnetic layer (34) and then UV curing the liquid to form the solid liner (16). The coating carrier (16) retains the magnetic sheet (14) together after the sheet (14) has been die cut and enables the sheet (14) to be easily and quickly removed from a stack of other similar magnetic sheets without inhibiting the desired magnetic properties of the finished printed blank (10).

43 Claims, 3 Drawing Sheets

FIG. 1
3
EAT
AT
FRANK'S
PIZZERIA
Corner of Main & Central
Dine-in or Carry Out
555-5555
Valued Customer Coupon
Valued Customer Coupon
$2.00 OFF
Any Large Pizza
26
12
Valued Customer Coupon
Valued Customer Coupon
24
30a
14
EAT AT FRANK'S
PIZZERIA
Call Now... Carry Out
555-5555
EAT AT FRANK'S
PIZZERIA
Call Now... Carry Out
555-5555
38
42
40
18
10
3

DIE CUT SHEET WITH APPLIED COATING CARRIER

BACKGROUND OF INVENTION

1. Field of the Invention

The present invention relates generally to die cut printable sheets. More specifically, the present invention concerns a die cut printable sheet having an applied coating carrier. The applied coating carrier is a cured liquid that binds the die cut sheet together and enables the use of a magnetic substrate for efficient and cost-effective inline and offline printing applications.

2. Discussion of Prior Art

It is desirable in many printing applications to die cut printable blanks, from a web prior to printing the blanks. The web typically includes a printable layer carried on a substrate backing. The blanks are formed by sheeting the web and die cutting through both the printable layer and the substrate. The die cut or cuts often are used to form a removable section in the blank, such as a card. However, the removable section is preferably retained in the blank to facilitate subsequently feeding the blank through a printing system (e.g., a downstream inline print station in a press, an offline laser printer, etc.). Accordingly, some type of liner is commonly utilized to carry the die cut blanks to retain the removable sections laden therein. Liner applications have proven difficult and costly when using certain types of substrates. For example, when a magnetic sheet is used as the substrate, in addition to the retention function provided by the liner, it is desirable for the liner to further serve as a barrier between the magnetic sheets that sufficiently overcomes the magnetic attraction between the sheets to enable the sheets to be overlain (e.g., stacked, etc.) and then sequentially fed into the print system, one sheet at a time. For example, it is often desirable to feed the stacked sheets into a desktop printer, such as a laser or ink jet printer, one at a time for printing. However, it is further desirable for the liner to not interfere with the magnetic properties of the finished, printed product.

It is known in the art to adhere a solid liner (e.g., paper, film, etc.) to the substrate prior to die cutting the blanks to retain the removable section in the printable blank. These prior art liners typically include some type of release layer to enable the removable sections to be removed from the printable blank once printing is complete. Prior art liners are problematic and are subject to several undesirable limitations. For example, prior art liners include several plies, such as an adhesive layer, a liner layer, and a release layer. The multiple plies result in increased material costs and increased assembly costs. In addition, the multiple plies add undesirable thickness to the printable sheet that inhibits the ability to effectively feed the printable sheet through some printing systems. Furthermore, the prior art liners do not adequately enable the use of magnetic substrates. Even with the relative thickness of the prior art liners, they do not provide an adequate barrier to enable printable magnetic sheets to be quickly and easily separated from an overlain printable magnetic sheet. Moreover, the prior art liners must undesirably be completely removed from the finished printed product or the remnants of the liner interfere with the magnetic properties of the finished product.

SUMMARY OF INVENTION

The present invention provides a die cut printable sheet with an applied coating carrier that does not suffer from the problems and limitations of the prior art liners detailed above. The applied coating carrier is a cured liquid that binds the die cut sheet together and enables the use of a magnetic substrate for efficient and cost-effective inline and offline printing applications. The inventive applied coating carrier is significantly thinner than the prior art liners and is easier and more cost-effective to apply. In addition, the applied coating carrier provides an improved barrier with a reduced coefficient of friction enabling printable magnetic sheets to be quickly and easily separated from adjacent printable magnetic sheets for sequential feeding into a print system. Furthermore, the applied coating carrier does not need to be removed from the finished product and does not interfere with the magnetic properties of the finished printed product.

A first aspect of the present invention concerns a blank broadly including a sheet and a liner. The sheet presents a top printable surface and a bottom surface. The sheet has a die cut that projects from the top surface and extends at least substantially through the sheet between the top and bottom surfaces. The die cut defines a support section and a removable section at least partially circumscribed by the support section. The liner comprises a cured liquid coating applied to the bottom surface and serving to releasably interconnect the removable and support sections of the sheet.

A second aspect of the present invention concerns a method of forming a blank comprising the steps of feeding a sheet that presents a top printable surface and a bottom surface, applying a curable liquid to the bottom surface, curing the liquid to form a coating liner along at least a portion of the sheet, and die cutting the sheet in the at least a portion of the sheet to define a support section and a removable section at least partially circumscribed by the support section. The step of die cutting the sheet includes the step of forming the die cut to project from the top surface and extend at least substantially through the sheet between the top and bottom surfaces, such that the removable and support sections of the sheet are releasably interconnected at least substantially by the liner coating only.

Other aspects and advantages of the present invention will be apparent from the following detailed description of the preferred embodiments and the accompanying drawing figures.

BRIEF DESCRIPTION OF DRAWINGS

Preferred embodiments of the invention are described in detail below with reference to the attached drawing figures, wherein.

DETAILED DESCRIPTION

Figure 1:
FIG. 1 is a front elevational view of a printed blank constructed in accordance with a preferred embodiment of the present invention and including a bisectional, continuous printed surface formed from an upper paper section and a lower section comprising a magnetic, die cut substrate having an applied coating carrier.

FIG. 1 illustrates a die cut printed blank 10 constructed in accordance with the principles of a preferred embodiment of the present invention. As detailed below, the illustrated blank 10 provides a bisectional, continuous laser printed surface formed from separate paper and magnetic sheets joined with an adhesion seam. However, the principles of the present invention are not limited to any particular sheet or any particular printed surface, but equally apply to virtually any type of printable sheet. It is not important whether the surface is backed by a substrate layer, or is printed in any particular manner or even printable at all. However, it is important that the surface (and any substrate backing) be die cut in some manner during formation of the blank and include an applied coating carrier. The illustrated die cut printed blank 10 broadly includes a printable sheet 12, a magnetic sheet 14 coupled to the printable sheet 12, a coating carrier 16 applied to the magnetic sheet 14, and a plurality of die cuts 18 in the magnetic sheet 14.

The illustrated die cut printed blank 10 is a bisectional, generally rectangular blank presenting an upper section 20 and a lower section 22. As will be subsequently described in detail, the sections 20,22 are joined to present a continuous printable surface 24. That is to say, the blank 10 can be fed into a single printing system to print the entire surface 24 in one application. The upper section 20 comprises the printable sheet 12 and the lower section 22 comprises the magnetic sheet 14, the coating carrier 16, and the die cuts 18.

Figure 2:
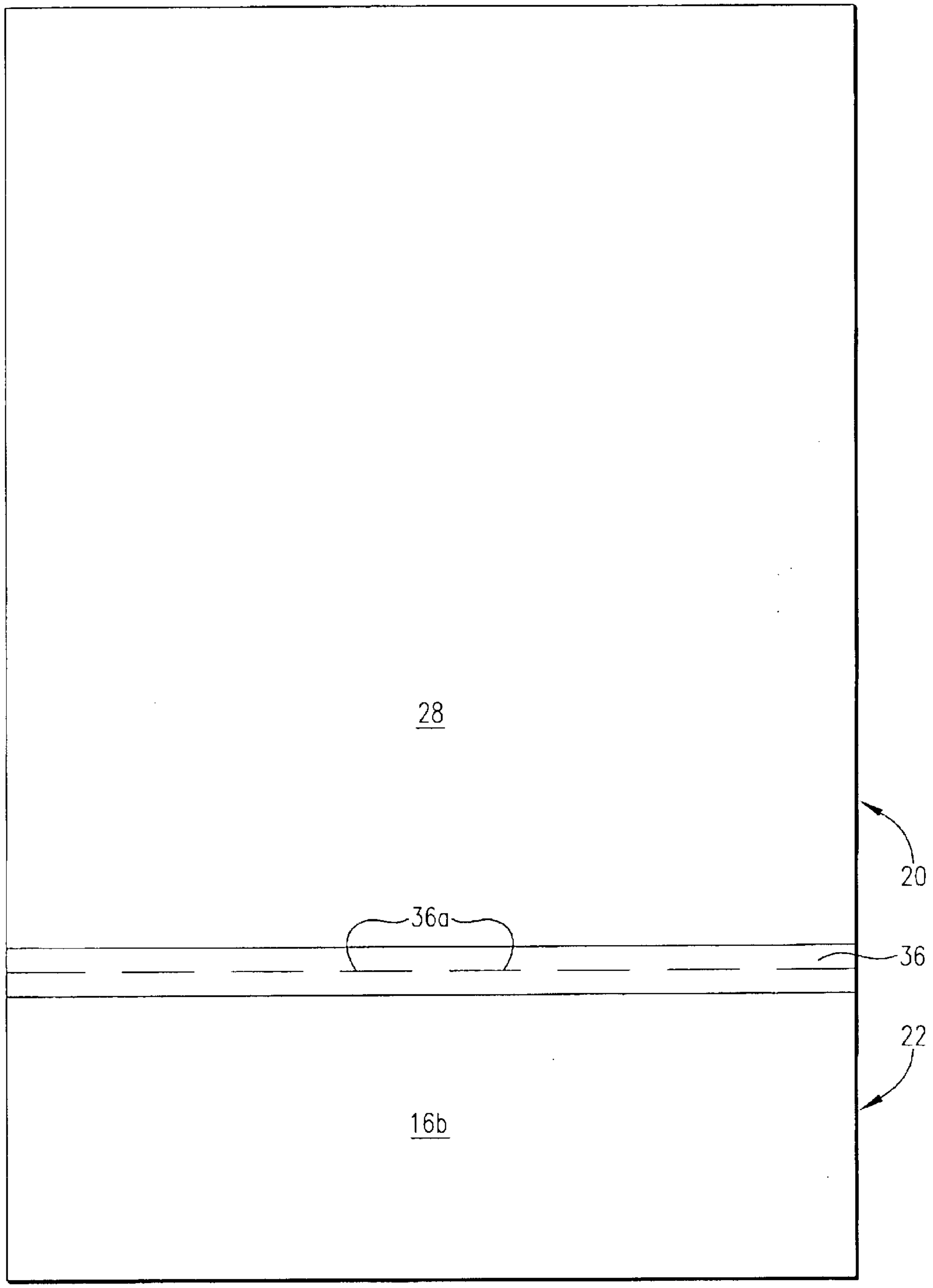
FIG. 2 is a rear elevational view of the printed blank illustrated in FIG. 1 showing the adhesion seam between the upper and lower sections.
Figure 3:
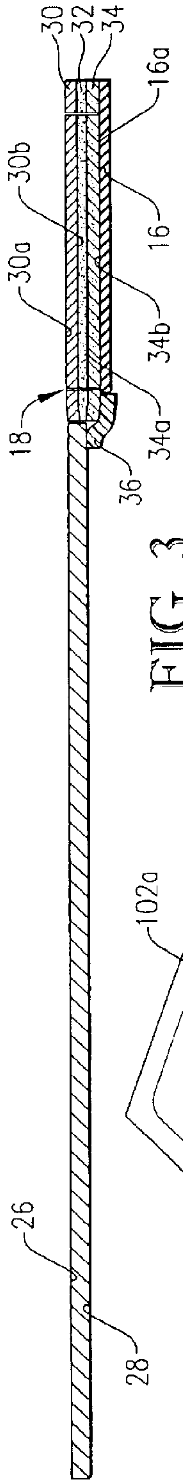
FIG. 3 is a sectional view of the printed blank taken substantially along line 3—3 of FIG. 1 showing the multiple layers of the lower section including the applied coating carrier.

As shown in FIGS. 1–3, the illustrated printable sheet 12 includes a top printable surface 26 and a bottom surface 28 opposite the surface 26. The printable surface 26 comprises the upper portion of the printable surface 24. In the sheet 12, the printable surface 26 is illustrated on the front face of the sheet 12, however, the bottom surface 28 is also printable and either or both of the surfaces 26,28 could be printed. The illustrated sheet 12 is preferably formed from a non-magnetic material, such as paper. The illustrated printable sheet 12 is a generally rectangular sheet, such as sheeted to an eight-and-one-half inch width from printable paper stock. However, the printable sheet 12 could be formed of virtually any printable material (e.g., synthetic resin, composite materials, metals, foil, combinations thereof, etc.) and could include a printable layer backed by a substrate. The printable sheet 12 is illustrated printed, however, the sheet 12 need not be printed at all.

As shown in FIG. 3, the magnetic sheet 14 includes a top printable layer 30, an intermediate adhesive layer 32, and a bottom magnetic layer 34. The layers 30,32,34 are joined in registry to present a rectangular sheet 14 with a complemental width dimension to correspond to the sheet 12. In this manner, when the sheets 12,14 are joined, the continuous printable surface 24 defined thereby, presents a generally uniform rectangular shape adapted to be printed in most conventional print systems. In more detail, the top printable layer 30 includes a front face 30*a* and an opposite rear face 30*b*. The front face 30*a* comprises the lower portion of the printable surface 24. The illustrated printable layer 30 is formed of vinyl. However, the printable layer could be formed of any printable material (e.g., paper, synthetic resin, other printable stock, etc.). The rear face 30*b* of the printable layer 30 is adhered to the magnetic layer by the intermediate adhesive layer 32. The adhesive layer 32 preferably permanently bonds the printable layer 30 to the magnetic layer 34 in registry. The adhesive layer 32 could be any conventional adhesive that provides sufficient adherence between the layers 30,34, such as a pressure sensitive adhesive. However, the adhesive could be any suitable adhesive known in the art, including repositionable adhesives. The bottom magnetic layer 34 includes a front face 34*a* and an opposite rear face 34*b*. The front face 34*a* is adhered to the printable layer 30 by the adhesive layer 32. As described in detail below, the rear face 34*b* receives the applied coating carrier 16. The magnetic layer 34 is preferably formed of a flexible magnetic material having a relatively thin configuration yet still providing sufficient magnetic flux to adhere to most ferromagnetic surfaces. For example, the magnetic layer 34 could be formed of a ferrite powder bonded with rubber in one manner well known in the art. Although the sheet 14 is preferably magnetic, it is within the ambit of the present invention to utilize virtually any substrate to support the one or both sections of the printable surface 24, and the blank 10 need not be bisectional.

As shown in FIGS. 2 and 3, the printable sheet 12 and the magnetic sheet 14 are joined together to present the printable surface 24. Particularly, the illustrated sheets 12,14 are joined by an adhesion seam 36. The adhesion seam 36 is preferably formed of a high heat resistant tape that can withstand exposure to lasers commonly used in printing applications. The adhesion seam 36 preferably retains the sheets 12,14 together during formation and completion of the finished printed blank 10 yet enables the magnetic sheet 14 to be subsequently removed from the printable sheet 12. For example, as further detailed below, the magnetic sheet 14 may include cards die cut therein that an end user can remove from the blank 10 for display and/or storage (e.g., on a refrigerator, etc.). The illustrated adhesion seam 36 includes perforations 36*a* that facilitate removal of the magnetic sheet 14 from the printable sheet 12. It is within the ambit of the present invention to utilize alternative methods to join the sheets 12,14. One such suitable method is disclosed in the application for U.S. patent Ser. No. 09/953,011 filed Sep. 11, 2001 and entitled COMPOSITE FORM WITH IMPRINTABLE MAGNETIC CARD (having a common inventor and assigned to the same assignee as the present application) which is hereby incorporated by reference herein as is necessary for a complete understanding of the present invention. As indicated above, when the sheets 12,14 are joined, the continuous printable surface 24 defined thereby, presents a generally uniform rectangular shape adapted to be printed in most conventional print stations. For example, the illustrated printable surface 24 presented by the blank 10 preferably has conventional eight-and-one-half by eleven inch margins to enable the blank 10 to be printed in conventional desktop print systems such as laser or ink jet printers. However, it is within the ambit of the present invention to configure and dimension the printable blank for virtually any printing application, including, but not limited to, larger production run print systems such as web-type, flexographic printing applications wherein blank dimensions are virtually unlimited.

Turning to FIG. 3, the coating carrier 16 is applied to the rear face 34*b* of the magnetic layer 34 of the sheet 14. As described in detail below, the coating carrier 16 retains the magnetic sheet 14 together after the sheet 14 has been die cut and enables the sheet 14 to be easily and quickly removed from a stack of other similar magnetic sheets (e.g., for sequential feeding into an offline print system, etc.) without inhibiting the desired magnetic properties of the finished printed blank 10. In more detail, in addition to providing a retention function, it is important that the coating carrier 16 provides a barrier capable of enabling the magnetic sheet 14 to be quickly and easily sequentially fed from a stack of other similar magnetic sheets (e.g., without the magnetic properties of the sheet 14 undesirably acting on adjacent sheets) yet present a minimal thickness. The illustrated coating carrier 16 is a thin solid liner (e.g., preferably two mils or less in thickness) having a relatively low coefficient of friction. As will subsequently described in detail, the liner 16 is formed by applying a curable liquid to the rear face 34*b* of the magnetic layer 34 and then sufficiently curing the liquid to form the solid liner 16.

The illustrated coating carrier 16 is a UV-curable liquid that is rolled onto the rear face 34*b* of the magnetic layer 34 and then cured by exposing the liquid to a UV light source sufficiently to form a polymeric film liner. When applied to a magnetic substrate, such as the magnetic layer 34, the cured film liner 16 is more preferably less than one mil in thickness and most preferably about one-tenth a mil thick. In this regard, the liner 16 does not interfere with downstream inline press stations. Furthermore, the thin profile enables the liner 16 to remain on the finished printed blank 10 without inhibiting the desired magnetic properties of the blank 10. For example, as described below, cards die cut and subsequently removed from the magnetic sheet 14 and including the liner 16 can still magnetically adhere to most ferromagnetic materials. However, as detailed below, the preferred thickness of the liner varies depending on the material the liner is applied to. The cured film liner 16 preferably presents a top face 16*a* and an opposite bottom face 16*b* (see FIG. 3). For purposes that will subsequently be described, it is important that the top face 16*a* present an adhesion surface sufficient to retain the sheet 14 together after the sheet 14 has been die cut, yet allows the die cut portion to be quickly and easily removed from the sheet 14. The bottom face 16*b* presents a slick finish, i.e. a finish having a relatively low coefficient of friction. In this manner, the barrier function of the liner 16 is enhanced, enabling the magnetic sheet 14 to be quickly and easily removed from a stack of similar magnetic sheets despite the magnetic properties of the sheets. One suitable coating is available from Northwest Coatings of Oak Creek, Wis. under the designation Laser Coating FT30LI. However, it is within the ambit of the present invention to utilize various alternative coatings, including, but not limited to, thermal-cured coatings, water-based coatings, acrylic coatings, solvent coatings, and hot melt coatings.

As previously indicated, the coating carrier 16 retains the magnetic sheet 14 together after the sheet 14 has been die cut, yet allows the die cut portion to be quickly and easily removed from the sheet 14. In more detail, a pair of cards 38 and 40 are formed in the illustrated magnetic sheet 14 by the plurality of die cuts 18 formed in the magnetic sheet 14 (see FIGS. 1 and 3). Each of the cards 38,40 are virtually identically configured and therefore only the card 38 will be described in detail with the understanding that the card 40 is similarly constructed.

The card 38 is formed in the magnetic sheet 14 by the die cut 18. The die cut 18 is an endless cut extending entirely through the top printable layer 30, entirely through the adhesive layer 32, and at least partially through the bottom magnetic layer 34 of the sheet 14. Preferably, the cut 18 does not extend entirely through the magnetic layer 34 but rather extends into the layer 34 to within about three mils of the coating carrier 16. That is to say, the cut 18 extends through the thickness of the lower section 22 preferably to within one to seven mils of extending all the way through. The depth of the cut 18 preferably varies depending on the thickness of the substrate material. For example, the thinner the substrate material, the deeper the cut 18 can extend into the material. As detailed below, for non-substrate applications, it may be desirable to extend the cut all the way through the sheet. If the cut 18 extends entirely through the magnetic layer 34, it is important that the cut does not extend at all into the coating 16. The endless die cut 18 divides the lower section 22, with the exception of the coating carrier (and the uncut thickness of the magnetic layer 34 under the die cut 18), into the card 38, defined interior to the cut 18, and a support section 42 circumscribing the card 38 (see FIG. 1). The coating carrier 16 remains entirely covering the rear face 34*b* of the magnetic layer 34 with the exception of the adhesion seam 36. In this manner, after the die cut 18 has been made, the coating carrier 16 retains the card 38 within the support section 42 to maintain the printable surface 24 in tact on the blank 10.

The card 38 is generally rectangular in shape and is preferably removable from the support section 42, and thus the finished printed blank 10. In this regard, the magnetic layer 34 and the coating carrier 16 preferably enable a clean shear of the card 38 from the support section 42. In this manner, the card 38 includes a portion of the printable layer 30, a portion of the adhesive layer 32, a portion of the magnetic layer 34, and a portion of the coating 16, all in registry. Given the clean shear capabilities of the magnetic layer 14 and the coating 16, as discussed above, the die cut 18 need not extend entirely through the magnetic layer 34. When the card 38 is removed from the blank 10, the portion of the magnetic sheet 14 included in the card 38 enables the card 38 to be removably and magnetically adhered to ferromagnetic materials. That is to say, the portion of the coating carrier 16, which remains on the card 38, does not inhibit the magnetic flux of the magnetic layer 34. It is within the ambit of the present invention to utilize various alternatively designed die cuts in the finished blank. For example, a die cut could simply be used to sheet a joined printable layer and substrate into sheets that are retained together for further processing in a press prior to being sheared apart. However, it is important that the blank include at least one die cut not extending through the coating liner.

The die cut printed blank 10 is preferably formed on a web-type inline rotary press, as is commonly used in various printing technologies including, but not limited to, flexographic or rotogravure printing applications. One such exemplary press is disclosed in the application for U.S. patent Ser. No. 10/205,818 filed Jul. 26, 2002 entitled CARRIER PAGE WITH DETACHABLE MAGNETIC CARD (having a common inventor and assigned to the same assignee as the current application) that is hereby incorporated herein by reference as is necessary for a complete understanding of the present invention. Those skilled in the art can readily make any necessary modifications to the press disclosed in the application referenced immediately above to produce the die cut printed blank 10. The printable sheet 12 and the magnetic sheet 14 preferably originate as rolls of continuous web fed into the press at an unwind station. However, the web for the magnetic sheet could be formed in the press in any manner known in the art. From the unwind station, each web is routed by various tensioning rollers into a subsequent station where the webs are aligned and tape is applied to form the adhesion seam 36 thus joining the webs into a single web.

The single web is then fed through a station where the curable liquid of the coating carrier 16 is applied. For example, the station could include an analox-type roller (e.g., a 14BCM analox roller for the one-tenth mil thick liner 16) that retrieves the curable liquid from a fountain and applies the liquid to a transfer roller. The transfer roller then applies the liquid over the entire backing of the magnetic sheet portion of the web (i.e., the portion of the web that results in the rear face 34*b* of the magnetic sheet 14). The curable liquid-laden web is next fed through a UV curing station to cure the liquid and thereby form the film liner 16. It is important that the cured liner 16 is not undesirably hard, therefore, the curable liquid should not be cured too much. For example, the curing station could comprise a soft cure system wherein the curable liquid liner is fed at around 150 fpm under a UV light source having a permissible range of 300–600 watts, and most preferably 500 watts. The wattage and feed rate could vary, however, it is important that the wattage and feed rate cooperate to provide the desired cure.

The liner-laden web is then fed through an exit station to form the printable blanks. At the exit station, the web is sheeted to the desired length and die cut to form the die cuts 18. The printable blanks can then be stacked and taken offline to a separate print station (e.g., a desktop laser or ink jet printer) to form the finished printed blank 10. However, the printable blanks formed in the press could also be printed inline in the press at one or more print stations in any manner known in the art. It is within the ambit of the present invention to utilize virtually any suitable process for forming the die cut printable blank of the present invention. However, it is important that the printable blank include at least one die cut and have a liquid applied coating that is formed into a liner that at least partially retains the die cut portion during at least a portion of the process.

Figure 4:
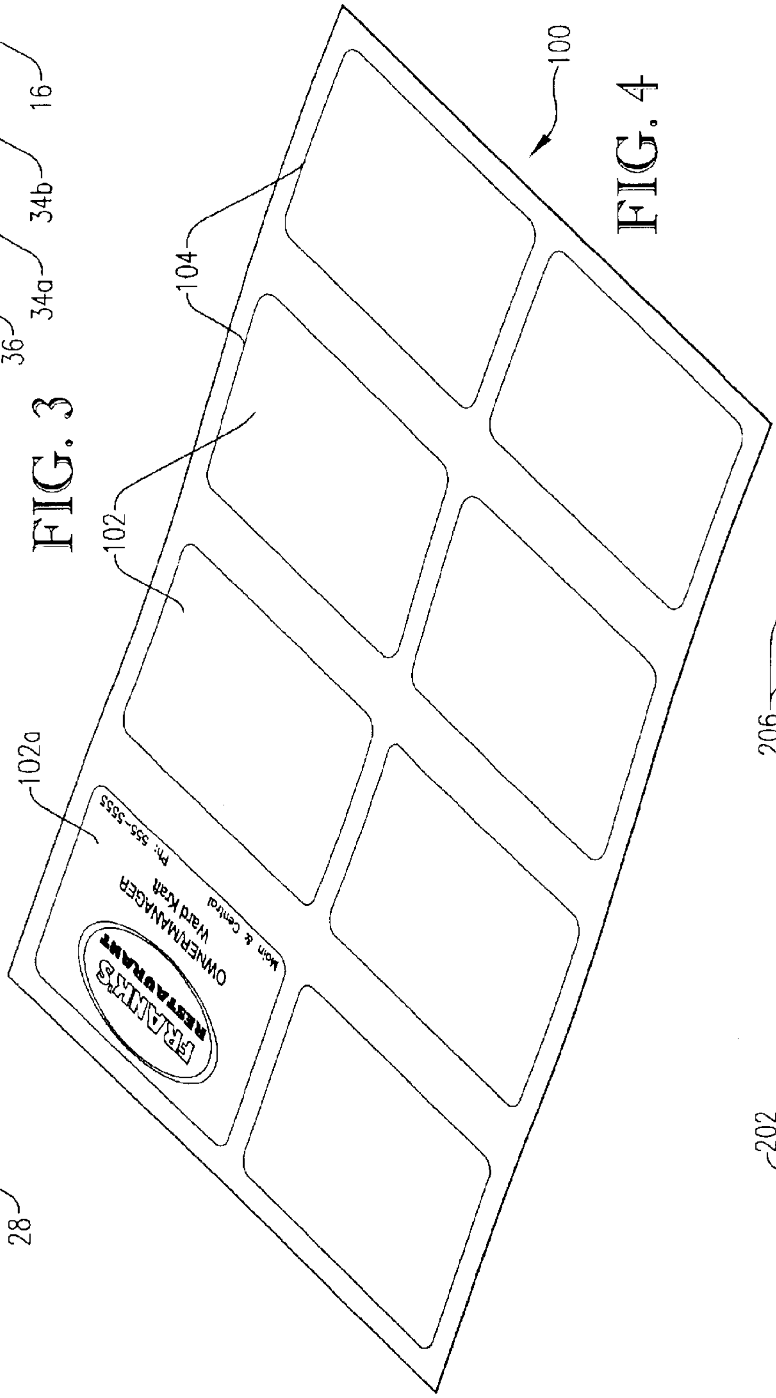
FIG. 4 is a perspective view of a partially printed blank constructed in accordance with a preferred alternative embodiment of the present invention and including a die cut magnetic substrate and an applied coating carrier.

As previously indicated, the printable surface of the blank need not be supported by a bisectional substrate. One such suitable alternative embodiment is the partially printed blank 100 illustrated in FIG. 4. The blank 100, similar to the previously described magnetic sheet 14, includes a printable top layer backed by a magnetic substrate. The bottom of the substrate is entirely covered by an applied coating liner similar to the coating carrier 16 detailed above. The blank 100 includes a plurality of removable cards 102 formed therein by endless die cuts 104 extending entirely through the printable layer and at least partially through the magnetic substrate. The illustrated cards 102 include a card 102*a* wherein the printable layer of the card 102*a* has been printed.

Figure 5:
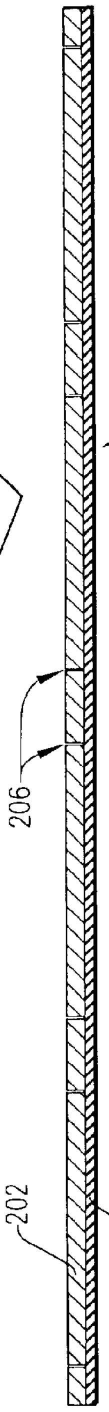
FIG. 5 is a sectional view of a printable blank constructed in accordance with a preferred alternative embodiment of the present invention and including a die cut sheet and an applied coating carrier.

As previously indicated, the printable surface of the blank need not be backed by a substrate, magnetic or otherwise, and could be entirely presented by a single layer sheet. One such suitable alternative embodiment is the printable blank 200 illustrated in FIG. 5. The blank 200 includes a printable single layer sheet 202 and a coating liner 204 applied to the sheet 202. The sheet 202 is preferably formed from paper stock but could be formed of any suitable non-magnetic material. Both of the faces of the sheet 202 are printable surfaces. The bottom surface of the sheet 202 is printable both before and after the liner 204 has been applied (i.e., the liner 204 is also printable). The coating liner 204 is similar to the previously described coating carrier 16. The bottom surface of the sheet 202 is entirely covered by the applied coating liner 204. However it is within the ambit of the present invention to apply the liner to only a portion, or portions, of the bottom surface of the sheet (e.g., the portions underlying the die cuts as discussed below). With a paper sheet, the liner 204 most preferably has a thickness of one mil. The blank 200 includes a plurality of die cuts 206 preferably extending entirely through the sheet 202 to prevent the formation of chads along the cut line.

The preferred forms of the invention described above are to be used as illustration only, and should not be utilized in a limiting sense in interpret the scope of the present invention. Obvious modification to the exemplary embodiments, as hereinset forth, could be readily made by those skilled in the art without depart from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:

1. A method of forming a blank comprising the steps of:

(a) forming a sheet that presents a top printable surface and a bottom surface;

(b) applying a curable liquid to the bottom surface;

(c) curing the liquid to form a coating liner along at least a portion of the sheet; and (d) die cutting the sheet in said at least a portion of the sheet to define a support section and a removable section at least partially circumscribed by the support section, step (d) including the step of forming the die cut to project from the top surface and extend at least substantially through the sheet between the top and bottom surfaces, such that the removable and support sections of the sheet are releasably interconnected at least substantially by the liner coating only.

2. The method as claimed in claim 1, step (a) including the step of forming at least a portion of the sheet from a printable layer presenting the printable surface and a substrate layer presenting the bottom surface.

3. The method as claimed in claim 2, step (a) further including the step of forming the substrate layer from a magnetic material.

4. The method as claimed in claim 3, step (a) further including the steps of forming another portion of the sheet from a nonmagnetic material and joining the at least and another portions with an adhesion seam.

5. The method as claimed in claim 4, step (a) further including the step of forming the adhesion seam with tape.

6. The method as claimed in claim 1, step (c) including the step of exposing the liquid to UV light.

7. The method as claimed in claim 6, step (c) further including the step of exposing the liquid to between 300 and 600 watts of UV light.

8. The method as claimed in claim 1, step (c) including the step of exposing the liquid to heat.

9. The method as claimed in claim 1, step (b) being performed with a water-based liquid.

10. The method as claimed in claim 1, step (b) being performed with an acrylic liquid.

11. The method as claimed in claim 1, step (b) being performed with a solvent.

12. The method as claimed in claim 1, step (b) being performed in such a manner that the liner formed in step c) presents a thickness of less than two mils.

13. The method as claimed in claim 1, step (d) including the step of die cutting the sheet to within three mils of the liner.

14. The method as claimed in claim 1, step (d) being performed in such a manner that the die cut formed in the sheet is endless.

15. The method as claimed in claim 14, step (d) being performed in such a manner that the removable section formed by the die cut is generally rectangular.

16. The method as claimed in claim 14, step (d) further including the step of die cutting the sheet in said at least a portion of the sheet to define an additional removable section at least partially circumscribed by the support section, step (d) including the step of forming the die cut to project from the top surface and extend at least substantially through the sheet between the top and bottom surfaces, such that the additional removable and support sections of the sheet are releasably interconnected at least substantially by the liner coating only.

17. The method as claimed in claim 1, step (b) including the step of covering entirely the bottom surface with the applied liquid.

18. A blank comprising:

a sheet presenting a top printable surface and a bottom surface, said sheet having a die cut that projects from the top surface and extends at least substantially through the sheet between the top and bottom surfaces, said die cut defining a support section and a removable section at least partially circumscribed by the support section; and a liner comprising a cured liquid coating applied to the bottom surface and serving to releasably interconnect the removable and support sections of the sheet, said sheet including a first portion and a second portion, said portions being joined by an adhesion seam.

19. The blank as claimed in claim 18, said sheet being formed of paper.

20. The blank as claimed in claim 18, said die cut projecting entirely through the sheet.

21. The blank as claimed in claim 18, said adhesion seam comprising tape.

22. The blank as claimed in claim 18, said first portion being formed of a nonmagnetic material, said second portion being at least in part formed of a magnetic material.

23. The blank as claimed in claim 22, said support and removable sections being defined in the second portion.

24. The blank as claimed in claim 23, said second portion including a top printable layer and a bottom magnetic layer, said magnetic layer defining at least a part of said bottom surface opposite from the top layer.

25. The blank as claimed in claim 24, said cured liquid coating being applied to said at least a part of said bottom surface.

26. The blank as claimed in claim 25, said die cut extending through the top layer and at least partially through the bottom layer.

27. The blank as claimed in claim 18, said sheet including a top printable layer and a bottom magnetic layer, said magnetic layer defining said bottom surface opposite from the top layer.

28. The blank as claimed in claim 18, said liner being at least substantially cured by exposure to UV light.

29. The blank as claimed in claim 28, said liner being at least substantially cured by exposure to between 300 and 600 watts of UV light.

30. The blank as claimed in claim 18, said liner being at least substantially cured by exposure to heat.

31. The blank as claimed in claim 18, said liner being a cured water-based liquid.

32. The blank as claimed in claim 18, said liner being a cured acrylic liquid.

33. The blank as claimed in claim 18, said liner being a cured solvent.

34. The blank as claimed in claim 18, said liner presenting a thickness of less than two mils.

35. The blank as claimed in claim 34, said die cut projecting through the sheet to within three mils of the liner.

36. The blank as claimed in claim 18, said die cut being an endless cut.

37. The blank as claimed in claim 36, said removable section being generally rectangular.

38. The blank as claimed in claim 36, said sheet having an additional die cut that projects from the top surface and extends at least substantially through the sheet between the top and bottom surfaces, said additional die cut defining an additional removable section at least partially circumscribed by the support section, said liner serving to releasably interconnect the additional removable and support sections of the sheet.

39. The blank as claimed in claim 18, said liner covering entirely the bottom surface.

40. The blank as claimed in claim 18, said bottom surface having only the liner applied thereto.

41. The blank as claimed in claim 18, said bottom surface being printable.

42. A blank comprising:

a sheet presenting a top printable surface and a bottom surface, said sheet having a die cut that projects from the top surface and extends at least substantially through the sheet between the top and bottom surfaces, said die cut defining a support section and a removable section at least partially circumscribed by the support section; and a liner comprising a cured liquid coating applied to the bottom surface and serving to releasably interconnect the removable and support sections of the sheet, said sheet including a top printable layer and a bottom magnetic layer, said magnetic layer defining said bottom surface opposite from the top layer, said cured liquid coating being applied to the entire bottom surface.

43. The blank as claimed in claim 42, said die cut extending through the top layer and at least partially through the bottom layer.

* * * * *